(12) United States Patent
Nieters et al.

(10) Patent No.: US 10,975,686 B2
(45) Date of Patent: Apr. 13, 2021

(54) DETECTION SYSTEM INCLUDING SENSOR AND METHOD OF OPERATING SUCH

(71) Applicant: General Electric Company, Schenectady, NY (US)

(72) Inventors: Edward James Nieters, Burnt Hills, NY (US); Emad Andarawis Andarawis, Ballston Lake, NY (US); Dayu Huang, Rexford, NY (US); Jayakrishnan Unnikrishnan, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/492,784

(22) Filed: Apr. 20, 2017

(65) Prior Publication Data
US 2018/0306026 A1    Oct. 25, 2018

(51) Int. Cl.
*E21B 47/09*    (2012.01)
(52) U.S. Cl.
CPC ............ *E21B 47/091* (2013.01); *E21B 47/09* (2013.01)
(58) Field of Classification Search
CPC .............................. E21B 47/09; E21B 47/091
See application file for complete search history.

(56) References Cited

U.S. PATENT DOCUMENTS

| | | | |
|---|---|---|---|
| 6,370,082 B1* | 4/2002 | Gardner | E21B 47/16 340/854.4 |
| 7,069,775 B2 | 7/2006 | Fredette et al. | |
| 9,062,531 B2 | 6/2015 | Jones | |
| 9,187,974 B2 | 11/2015 | Coonrod et al. | |

(Continued)

FOREIGN PATENT DOCUMENTS

| | | |
|---|---|---|
| JP | 2015010839 A | 1/2015 |
| WO | 2016086794 A1 | 6/2016 |

OTHER PUBLICATIONS

Zachary S. Leonard, "Development of a Down hole Ultrasonic Transducer for Imaging While Drilling", IEEE International Ultrasonic's Symposium (IUS), p. 1-4, 2016.

(Continued)

*Primary Examiner* — David M. Gray
*Assistant Examiner* — Andrew V Do
(74) *Attorney, Agent, or Firm* — Baker Hughes Patent Operation (57) ABSTRACT

A detection system to detect an object in a blowout prevention system of a production system includes a sensor coupled to the blowout prevention system and configured to send an ultrasonic pulse toward the object. The sensor is further configured to receive a signal including the ultrasonic pulse and noise after the ultrasonic pulse interacts with the object. The detection system also includes a controller coupled to the sensor and configured to identify the ultrasonic pulse in the signal using a first cancellation signal at a first time and a second cancellation signal at a second time. The controller is further configured to determine that the first cancellation signal corresponds to the noise in the signal at the first time, and determine that the second cancellation signal corresponds to the noise in the signal at the second time. The controller is configured to determine a characteristic of the object based on the ultrasonic pulse.

17 Claims, 5 Drawing Sheets

(56) References Cited

U.S. PATENT DOCUMENTS

| | | | |
|---|---|---|---|
| 9,249,658 B2 | 2/2016 | Macrae | |
| 9,274,243 B2 | 3/2016 | Chau et al. | |
| 9,416,649 B2 | 8/2016 | Andarawis et al. | |
| 9,513,372 B2 | 12/2016 | Valero et al. | |
| 2004/0007059 A1* | 1/2004 | Tudor | E21B 43/25 73/152.42 |
| 2010/0262009 A1 | 10/2010 | Lynch et al. | |
| 2012/0067126 A1* | 3/2012 | Hartog | F16L 55/48 73/584 |
| 2013/0107662 A1 | 5/2013 | Li et al. | |
| 2015/0112949 A1 | 4/2015 | Marland | |
| 2016/0312603 A1* | 10/2016 | Gottlieb | E21B 47/091 |
| 2016/0369619 A1 | 12/2016 | Parmeshwar et al. | |

OTHER PUBLICATIONS

International Search Report and Written Opinion issued in connection with corresponding PCT Application No. PCT/US2018/016945 dated May 18, 2018.

* cited by examiner

DETECTION SYSTEM INCLUDING SENSOR AND METHOD OF OPERATING SUCH

STATEMENT REGARDING FEDERALLY SPONSORED RESEARCH AND DEVELOPMENT

This invention was made with Government support under contract number 11121-5503-01 awarded by the Research Partnership to Secure Energy for America (RPSEA). The Government has certain rights in this invention.

BACKGROUND

The field of the disclosure relates generally to detection systems, and more particularly to a system including a sensor that receives a signal including an ultrasonic pulse and noise.

Many known detection systems include sensors that are configured to detect an object. For example, at least some known detection systems are configured to detect a pipe that extends through a wellbore. In at least some known detection systems, a sensor sends a pulse toward the pipe. After the pulse interacts with the pipe, the sensor receives a signal including the pulse and noise. Examples of noise include sound generated by the self-resonance, i.e., ringing, of the sensor. At least some known detection systems use a pre-recorded signal to cancel out the noise. However, the noise in the signal varies over time and the pre-recorded signal generally does not correspond to the noise in the signal at different times.

Therefore, it is desirable to provide a detection system that processes signals as the signals vary over time and improves signal to interference and noise ratio (SINR).

BRIEF DESCRIPTION

In one aspect, a detection system to detect an object in a blowout prevention system of a production system is provided. The detection system includes a sensor coupled to the blowout prevention system and configured to send an ultrasonic pulse toward the object. The sensor is further configured to receive a signal including the ultrasonic pulse and noise after the ultrasonic pulse interacts with the object. The detection system also includes a controller coupled to the sensor and configured to identify the ultrasonic pulse in the signal using a first cancellation signal at a first time and a second cancellation signal at a second time. The controller is further configured to determine that the first cancellation signal corresponds to the noise in the signal at the first time, and determine that the second cancellation signal corresponds to the noise in the signal at the second time. The controller is configured to determine a characteristic of the object based on the ultrasonic pulse.

In another aspect, a method of detecting an object in a production system is provided. The method includes receiving, using a sensor, a signal including a first ultrasonic pulse and noise. The method also includes determining, using a controller, that a first cancellation signal corresponds to the noise in the signal at a first time. The method further includes identifying, using the controller, the first ultrasonic pulse in the signal using the first cancellation signal at the first time. The method also includes determining, using the controller, that a second cancellation signal corresponds to the noise in the signal at a second time. The method further includes identifying a second ultrasonic pulse in the signal using the second cancellation signal at the second time. The method also includes determining a characteristic of the object based on at least one of the first ultrasonic pulse and the second ultrasonic pulse.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disc (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "excitation code" refers to a representation of a pattern or sequence of pulses produced by a transducer.

The methods and systems described herein provide reliable detection of an object. For example, embodiments of a detection system include a sensor that sends pulses towards an object and a controller that identifies a pulse in a signal received by the sensor after the pulse interacts with the object. The signal includes the pulse and noise, such as ringing of the sensor. The controller is configured to determine variations in the signal. In addition, the controller is configured to determine first and second cancellation signals based on the variations. In some embodiments, the controller accesses the first and second cancellation signals in a database. In further embodiments, the controller generates at least one of the first cancellation signal and the second cancellation signal. As a result, the controller is able to cancel noise from the signal as the noise varies over time. In addition, the controller reliably identifies the pulse in the signal. Accordingly, the detection system provides more accurate detection of characteristics of the object in comparison to at least some known detection systems.

Figure 1:
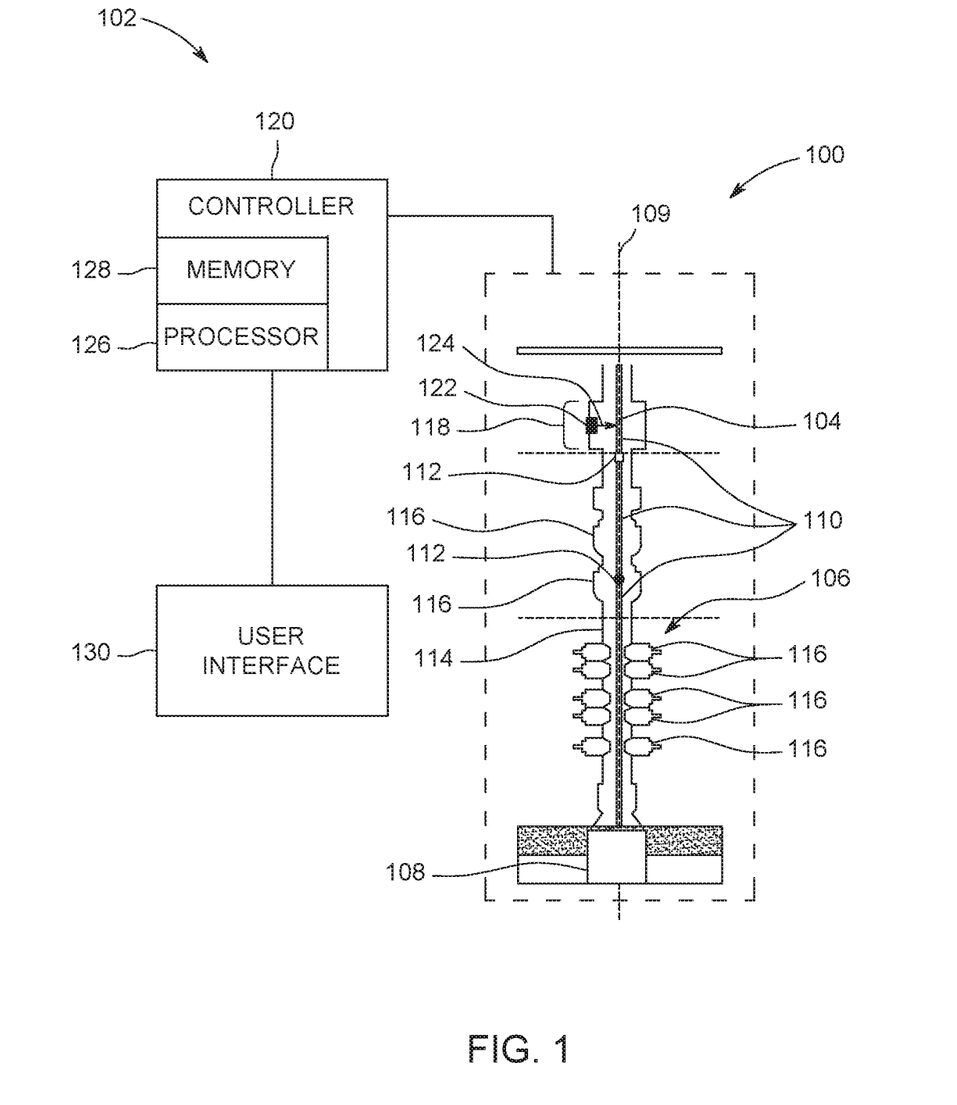
FIG. 1 is a schematic view of an exemplary production system including a detection system.

FIG. 1 is a schematic view of an exemplary production system 100 including a detection system 102. Production system 100 includes detection system 102, a pipe 104, and a blowout prevention (BOP) system 106. Pipe 104 extends through a wellbore 108 along a longitudinal axis 109 of wellbore 108 during operation of production system 100. For example, during a drilling phase, production system 100 is configured to transport fluid through pipe 104 to wellbore 108. In the exemplary embodiment, pipe 104 includes a plurality of sections 110 coupled together by pipe joints 112. In alternative embodiments, production system 100 has any configuration that enables production system 100 to operate as described herein.

In the exemplary embodiment, BOP system 106 includes a stack 114 and a plurality of blowout preventers 116 configured to seal wellbore 108. For example, blowout preventers 116 include, without limitation, an annular preventer, a blind shear ram, a casing shear ram, a pipe ram, and/or any other suitable blowout preventer. As pipe 104 moves through BOP system 106, detection system 102 determines characteristics of pipe 104, such as a size and location of pipe 104. In alternative embodiments, production system 100 includes any BOP system 106 that enables production system 100 to operate as described herein.

Also, in the exemplary embodiment, detection system 102 includes a plurality of sensors 118 and a controller 120. Sensors 118 are coupled to BOP system 106 and spaced about pipe 104. In some embodiments, each sensor 118 includes a transducer 122. Transducers 122 vibrate at an ultrasonic frequency and generate ultrasonic pulses 124. Each ultrasonic pulse 124 has a frequency, an amplitude, and a wavelength controlled by the vibration of transducer 122. Sensors 118 are configured to send ultrasonic pulses 124 having a predetermined duration. In alternative embodiments, detection system 102 includes any sensor 118 that enables detection system 102 to operate as described herein.

In addition, in the exemplary embodiment, controller 120 is communicatively coupled to sensors 118 and configured to receive signals from sensors 118. Controller 120 includes a processor 126 and a memory 128. Processor 126 is configured to determine a characteristic of production system 100 based on signals from sensors 118. Memory 128 is coupled to processor 126 and is configured to store information such as determined characteristics, operational parameters, and signals. In some embodiments, processor 126 is configured to retrieve and store information on memory 128. In alternative embodiments, detection system 102 includes any controller 120 that enables detection system 102 to operate as described herein.

Moreover, in the exemplary embodiment, controller 120 determines a characteristic of pipe 104 based at least in part on information received from sensors 118. For example, in some embodiments, controller 120 is configured to determine at least one of a size and a location of pipe 104 in BOP system 106 based on the information from sensors 118. In addition, in some embodiments, controller 120 makes determinations based on operational parameters including a time that sensor 118 detects pipe joint 112 (i.e., a detection time), an operational setting of production system 100, a rate of penetration, a location of a component of BOP system 106, a design characteristic of production system 100, and a size of pipe joint 112. In some embodiments, signals and operational parameters are received by controller 120 from sensors and/or other components of production system 100. In further embodiments, operational parameters are provided by a user. In some embodiments, controller 120 determines the operational parameters from sensor readings and/or user inputs. In alternative embodiments, controller 120 utilizes any information that enables detection system 102 to operate as described herein.

In addition, in the exemplary embodiment, production system 100 includes a user interface 130. User interface 130 is configured to provide data to a user and/or receive user inputs. For example, in some embodiments, user interface 130 includes a display which provides data in a readable format for the user. In further embodiments, user interface 130 includes a keyboard and/or other input device. In alternative embodiments, production system 100 includes any user interface 130 that enables production system 100 to operate as described herein. In some embodiments, user interface 130 is omitted and production system 100 is at least partially automated.

Figure 2:
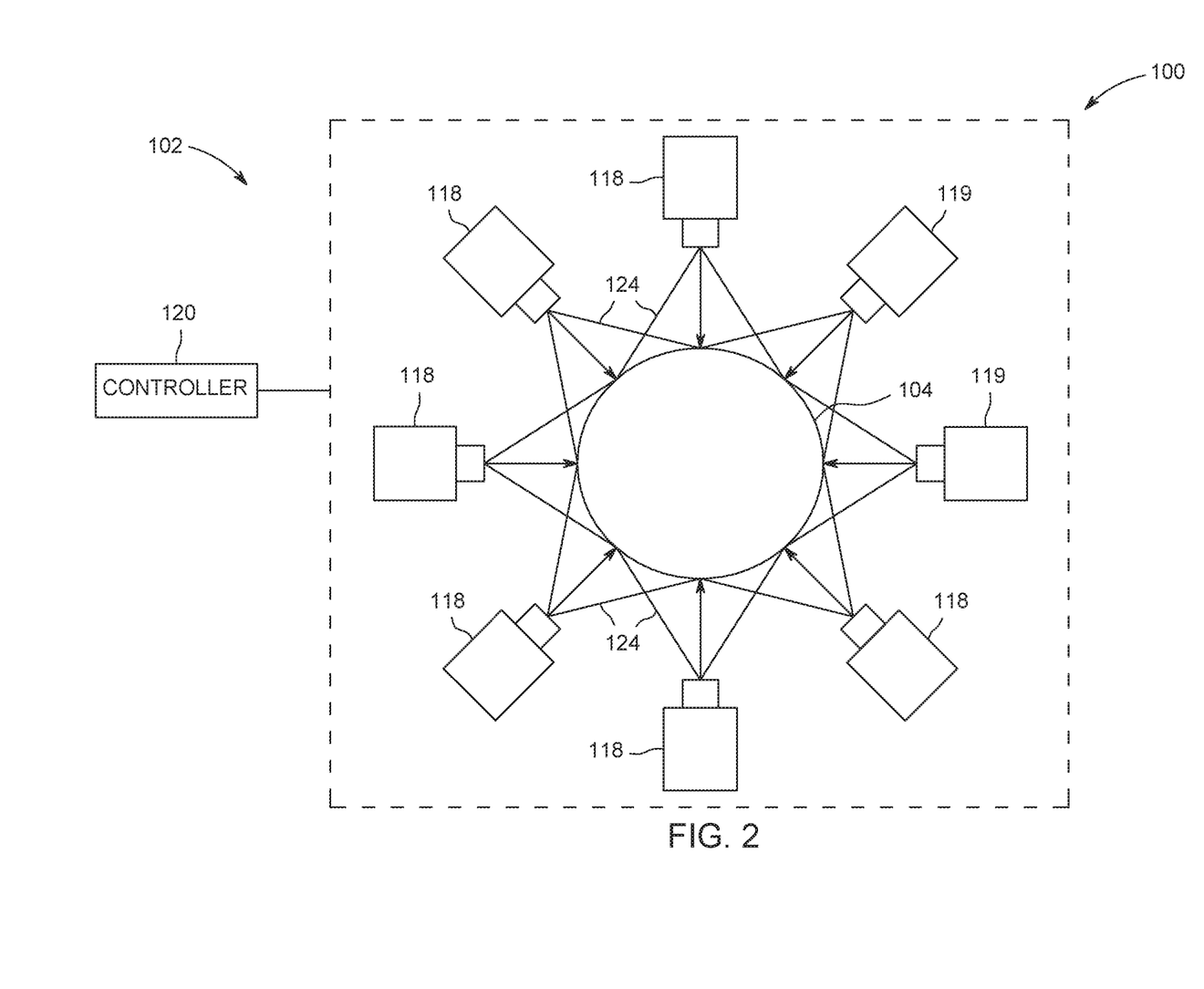
FIG. 2 is a schematic plan view of a plurality of sensors of the production system shown in FIG. 1.

FIG. 2 is a schematic view of a plurality of sensors 118 of production system 100. In the exemplary embodiment, sensors 118 are spaced about pipe 104. Each sensor 118 is configured to send ultrasonic pulses 124 toward pipe 104 and receive ultrasonic pulses 124 redirected by pipe 104. In alternative embodiments, sensors 118 are configured to send ultrasonic pulses 124 toward any object that enables production system 100 to operate as described herein. For example, in some embodiments, sensors 118 send ultrasonic pulses 124 towards a cable, a pipe, a tool, and/or any other component of production system 100.

In some embodiments, detection system 102 includes at least one sensor 118. In further embodiments, detection system 102 includes a plurality of sensors 118 spaced at equal angular intervals. In the exemplary embodiment, detection system 102 includes eight sensors 118 positioned about pipe 104. In alternative embodiments, detection system 102 includes any number of sensors 118 positioned in any manner that enables production system 100 to operate as described herein.

In the exemplary embodiment, sensor 118 receives a signal including ultrasonic pulse 124 and noise such as the self-resonance, i.e., ringing, from first sensor 118. In some embodiments, sensor 118 receives a signal including ultrasonic pulse 124 and/or noise from a second sensor 119. In the exemplary embodiment, controller 120 is configured to identify ultrasonic pulse 124 in the signal. Specifically, controller 120 uses a first cancellation signal to remove and/or reduce noise in the signal and identify ultrasonic pulse 124 in the signal. In addition, as the signal varies over time, controller 120 is configured to identify variations in the signal, e.g., points in the signal where the noise departs from expected noise, and determine a second cancellation signal based on the variations in the signal. Controller 120 uses the second cancellation signal to remove and/or reduce noise in the signal and identify ultrasonic pulse 124 in the signal. In alternative embodiments, controller 120 identifies ultrasonic pulse 124 in any manner that enables detection system 102 to operate as described herein.

In addition, in some embodiments, controller 120 is configured to determine a third cancellation signal that is different than the first cancellation signal and the second cancellation signal. In some embodiments, the first cancellation signal, the second cancellation signal, and the signal cancellation signal have different frequencies, amplitudes, delay, phase-noise, and/or wavelengths. The first cancellation signal, the second cancellation signal, and the third cancellation signal allow detection system 102 to identify ultrasonic pulses 124 in the signal as the signal varies over time. For example, in some embodiments, noise in the signal varies and controller 120 selects at least one of the first cancellation signal, the second cancellation signal, and the third cancellation signal that corresponds to the noise in the signal at a specific point in time. In contrast, at least some known detection systems utilize a constant cancellation signal. As a result, the processed signal in at least some known detection systems degrades over time and the reliability of the systems are reduced. In comparison, detection system 102 provides varying noise cancellation to increase the reliability of detection system 102 across a longer time frame. In alternative embodiments, detection system 102 uses any cancellation signal that enables detection system 102 to operate as described herein.

Also, in the exemplary embodiment, at least one sensor 118 of detection system 102 is configured to send a series of ultrasonic pulses 124 towards the object and controller 120 is configured to determine a characteristic based on the series of ultrasonic pulses 124. For example, in some embodiments, controller 120 compares ultrasonic pulses 124 identified in a series of signals and determines a characteristic, such as a distance between sensor 118 and pipe 104, based on ultrasonic pulses 124.

Figure 3:
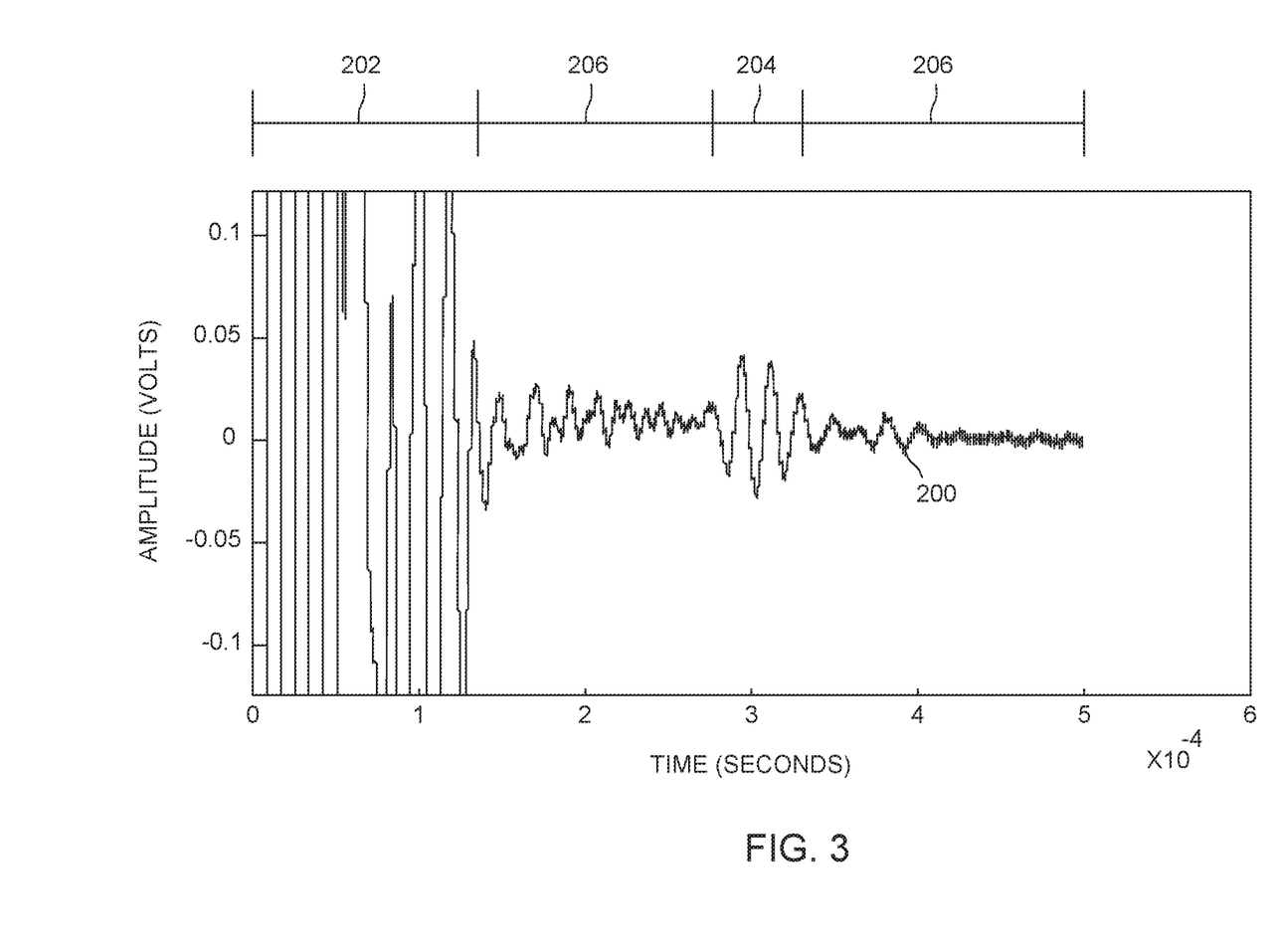
FIG. 3 is an exemplary graphical representation of amplitude versus time for a signal received by the detection system shown in FIGS. 1 and 2.
Figure 4:
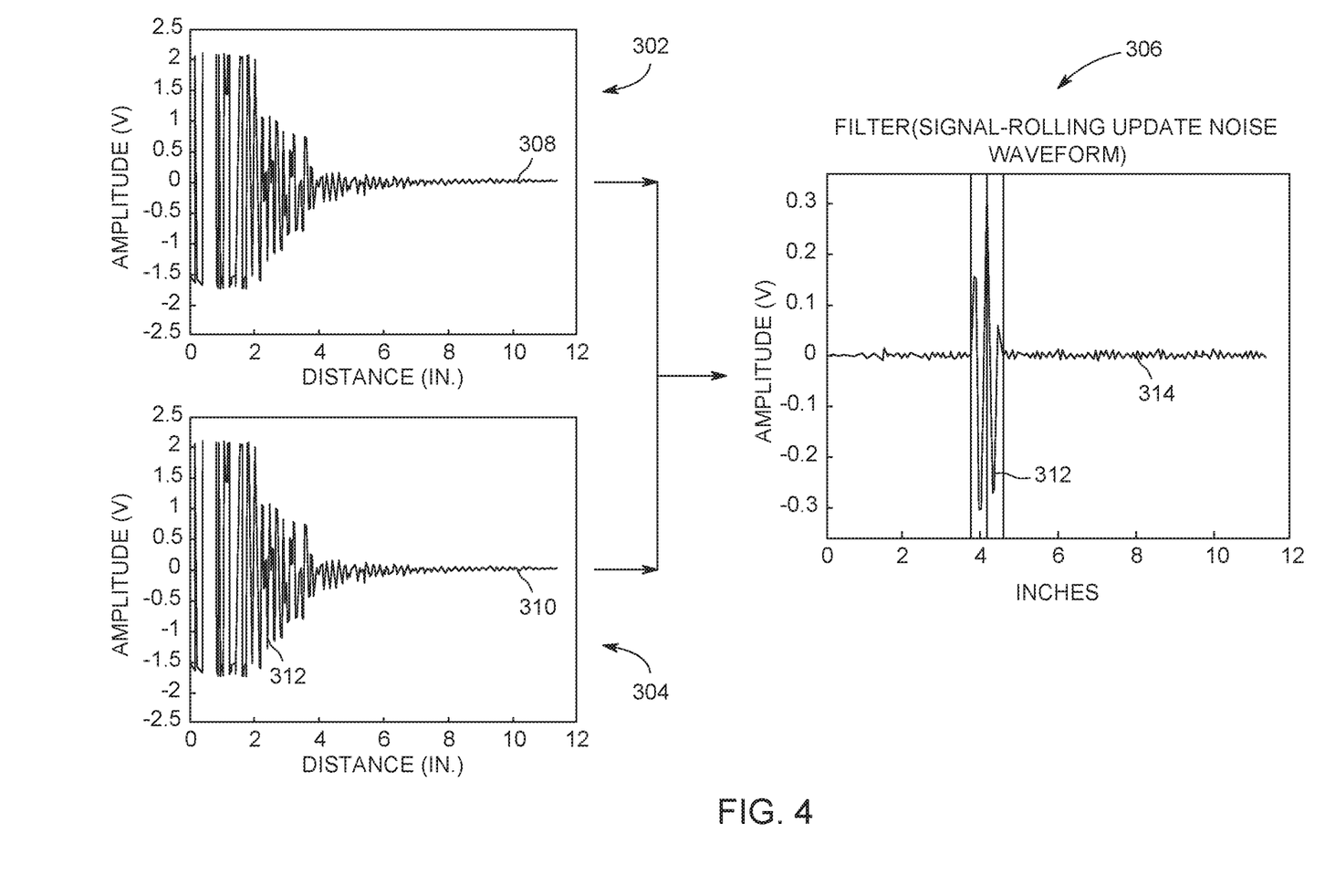
FIG. 4 is a series of exemplary graphical representations of amplitude versus time during processing of a signal by the detection system shown in FIGS. 1 and 2.

FIG. 3 is an exemplary graphical representation of amplitude versus time for a signal 200 received by detection system 102 (shown in FIGS. 1 and 2). FIG. 4 includes an X-axis indicating time (seconds), a Y-axis indicating amplitude (volts), and a curve representing signal 200. Signal 200 includes ultrasonic pulse 202, an echo or target pulse 204, and noise 206. In operation, ultrasonic pulse 202 is sent by sensor 118 (shown in FIG. 2) towards an object. Ultrasonic pulse 202 includes an amplitude, a frequency, and a duration determined by sensor 118 or controller 120. After sensor 118 sends ultrasonic pulse 202, sensor 118 is configured to receive signals. Sensor 118 receives a signal including target pulse 204 and noise 206 after ultrasonic pulse 202 interacts with the object. Target pulse 204 is a portion of ultrasonic pulse 202 that has interacted with the object and been redirected back towards sensor 118. Noise 206 is any other signal received by sensor 118 such as ringing of sensor 118 and echoes from objects other than the target object. During processing, detection system 102 isolates target pulse 204 from noise 206. In particular, in the exemplary embodiment, detection system 102 detects and responds to variations in noise 206 to allow isolation of target pulse 204 when signal 200 varies over time.

FIG. 4 is a series of exemplary graphical representations 302, 304, 306 of amplitude versus time of signals during processing by detection system 102 (shown in FIGS. 1 and 2). Graphs 302, 304, 306 include X-axes indicating distance (inches) and Y-axes indicating amplitude (volts). A first graph 302 includes a curve representing a first signal 308. In the exemplary embodiment, first signal 308 does not include a target pulse and is used as a cancellation signal or filter. A second graph 304 includes a curve representing a second signal 310 including an echo or target pulse 312. Signals 308 and 310 are combined to generate a third signal 314. A third graph 306 includes a curve representing third signal 314. Third signal 314 includes a portion where target pulse 312 has been isolated. Noise such as ringing of sensor 118 and echoes from objects other than the target object has been removed by combining signals 308 and 310. In some embodiments, detection system 102 (shown in FIG. 1) determines a distance based on target pulse 312. In alternative embodiments, signals 308, 310, and 314 are processed in any manner that enables detection system 102 to operate as described herein.

In the exemplary embodiment, different cancellation signals 308 are used at different points in time to account for changes in second signal 310 over time. In some embodiments, first cancellation signal 308 is selected based on determined characteristics of second signal 310 such as frequency, amplitude, duration, and/or excitation code. For example, in some embodiments, the difference between consecutive samples of a signal is calculated for both second signal 310 and each signal in a database of recorded ringing signals. The determined difference between second signal 310 and the sampled signal is compared to those from the database by a metric such as cross-correlation, and a signal in the database is selected base on the metric. In further embodiments, first cancellation 308 is selected from a database of recorded ringing signals. In further embodiments, first cancellation signal 308 is generated based on temporal models and corresponds with second signal 310 at a determined time. Accordingly, detection system 102 reliably determines characteristics based on target pulse 312 for a broader range of signals and a greater range of times than systems that do not account for variations in noise over time.

Figure 5:
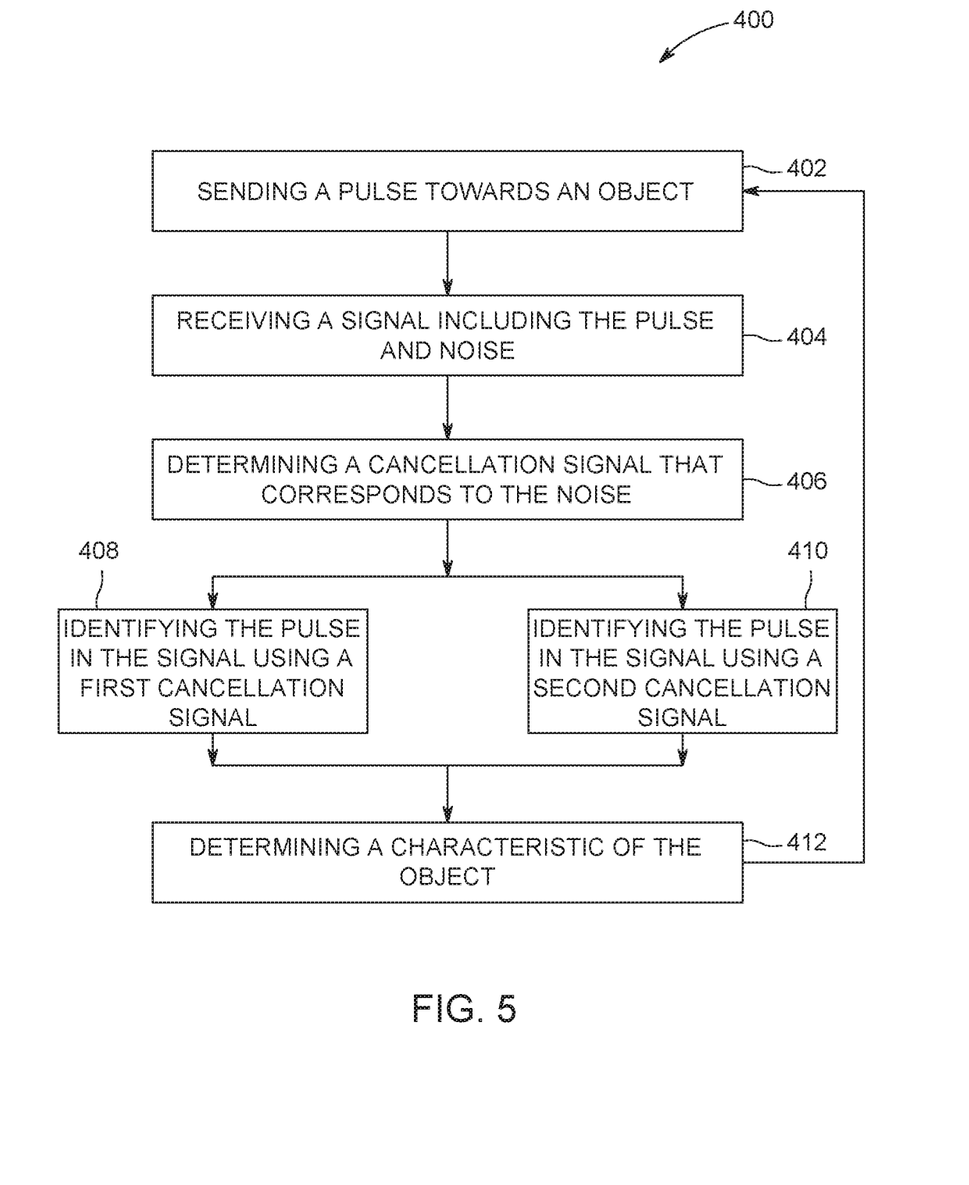
FIG. 5 is a flow diagram of an exemplary method of detecting characteristics of an object.

FIG. 5 is a flow diagram of an exemplary method 400 of detecting characteristics of an object such as pipe 104. In reference to FIGS. 1 and 3, method 400 generally includes sending 402 ultrasonic pulse 124 toward pipe 104, receiving 404 a signal including ultrasonic pulse 124 and noise, determining 406 a cancellation signal that corresponds to the noise, identifying 408 ultrasonic pulse 124 in the signal using a first cancellation signal and/or identifying 410 ultrasonic pulse 124 in the signal using a second cancellation signal, and determining 412 a characteristic of the object based on the pulse.

In some embodiments, determining 406 a cancellation signal that corresponds to the noise includes selecting a cancellation signal from a database of stored cancellation signals. In further embodiments, determining 406 includes generating a cancellation signal based on variations between the cancellation signal and the noise. In the exemplary embodiment, each cancellation signal includes a recorded ringing signal. The recorded ringing signal is modified to generate different cancellation signals over time as the noise varies. For example, in some embodiments, the recorded ringing signals are combined and/or portions of the cancellation signal are subtracted. In further embodiments, the noise is recorded when sensor 118 receives the signal and a new cancellation signal is generated based on the recorded noise.

In some embodiments, the method includes accessing a database including a plurality of cancellation signals and selecting a cancellation signal that corresponds to the received signal. For example, in some embodiments, identifying 408 includes controller 120 selecting a first cancellation signal that corresponds to a first noise in the signal at a first time. In addition, in some embodiments, identifying 410 includes controller 120 selecting a second cancellation signal that corresponds to a second noise in the signal at a second time. In some embodiments, the database of cancellation signals is stored on memory 128. In further embodiments, controller 120 combines first cancellation signal and second cancellation signal from the database to generate a third cancellation signal. In alternative embodiments, controller 120 uses any cancellation signal that enables production system 100 to operate as described herein.

Also, in some embodiments, controller 120 determines 406 the cancellation signal based on a characteristic of the signal. For example, in some embodiments, controller 120 selects the cancellation signal based on variations in the signal that correspond to different cancellation signals. In further embodiments, controller 120 determines a quality metric for the signal such as signal to interference and noise ratio (SINR) and selects the cancellation signal based at least partially on the quality metric. As used herein, the term "quality metric" refers to a value used to evaluate the signal. In alternative embodiments, controller 120 selects the cancellation signal in any manner that enables production system 100 to operate as described herein. For example, in some embodiments, controller 120 selects the cancellation signal based on a distance between sensor 118 and pipe 104.

In addition, in some embodiments, the method includes estimating a distance between sensor 118 and pipe 104 and using the estimated distance to isolate noise in a received signal. The isolated noise is then used to generate a cancellation signal. For example, in some embodiments, the isolated noise is combined with a previous cancellation signal to generate a cancellation signal that corresponds to the signal. In further embodiments, the noise and cancellation signal(s) are combined using algorithms including substitution, averaging, and/or any other mathematical functions.

Moreover, in some embodiments, the method includes generating a temporal model of ultrasonic sensor 118, ultrasonic pulse 124, the received signal, and/or the cancellation signal. For example, in some embodiments, the noise in the signal is estimated using a model of ultrasonic sensor 118 and the estimated noise is used to generate the cancellation signal. In particular, the cancellation signal is modeled as a linear convolution of an excitation code with a model of the channel from sensor 118 towards pipe 104 and back to sensor 118. In alternative embodiments, method 400 uses any temporal model that enables detection system 102 to operate as described herein.

In the exemplary embodiment, identifying 408 and identifying 410 includes comparing the respective cancellation signal to the received signal and cancelling noise in the received signal. In some embodiments, the cancellation signal is aligned with the received signal based on a temporal model of variations, e.g., jitter and gain in the received signal. As used herein, the term "jitter" refers to deviation of sampling times from the expected sampling times of the signal. The term "gain" refers to variation of the signal amplitude on per-sample basis.

In further embodiments, method 400 includes determining signal quality metrics such as SINR of segments of the received signal based on the noise cancellation signal and/or a temporal model. For example, in some embodiments, signal quality is measured using the local derivative of the cancellation signal. Segments of the received signal with low signal quality are down weighted or discarded during cancellation.

In some embodiments, detection system 102 uses a non-linear technique to account for sampling jitter. Specifically, detection system 102 determines statistical characteristics such as a maximum, a minimum, a median, and a mean of portions of the cancellation signal. Detection system 102 generates a cancelled signal that is the difference between the received signal and a selection of the statistical characteristics of the cancellation signal.

In some embodiments, method 400 includes determining a distance between sensor 118 and pipe 104. For example, in some embodiments, the distance is estimated using a first measurement when pipe 104 is at a first location and a second measurement when pipe 104 is at a second location. Detection system 102 then determines the difference between the first measurement and the second measurement and determines an estimated distance based on the difference. In alternative embodiments, detection system 102 determines distances in any manner that enables detection system 102 to operate as described herein.

The above-described methods and systems provide reliable detection of an object. For example, embodiments of a detection system include a sensor that sends pulses towards an object and a controller that identifies a pulse in a signal received by the sensor after the pulse interacts with the object. The signal includes the pulse and noise, such as ringing of the sensor. The controller is configured to determine variations in the signal. In addition, the controller is configured to determine first and second cancellation signals based on the variations. In some embodiments, the controller accesses the first and second cancellation signals in a database. In further embodiments, the controller generates at least one of the first cancellation signal and the second cancellation signal. As a result, the controller is able to cancel noise from the signal as the noise varies over time. In addition, the controller reliably identifies the pulse in the signal. Accordingly, the detection system provides more accurate detection of characteristics of the object in comparison to at least some known detection systems.

An exemplary technical effect of the methods, systems, and apparatus described herein includes at least one of: (a) providing a position of a pipe joint relative to BOP systems; (b) increasing reliability of BOP systems; (c) providing data relating to real-time geometry of a wellbore during operation; (d) providing a detection system that is compatible with different production systems; (e) providing a detection system for retrofitting to production systems; (f) increasing safety and efficiency of production systems; (g) reducing degradation of near-surface resolution of a signal; and (h) allowing determination of object characteristics based on a broader range of signals.

Some embodiments involve the use of one or more electronic or computing devices. Such devices typically include a processor or controller, such as a general purpose central processing unit (CPU), a graphics processing unit (GPU), a microcontroller, a field programmable gate array (FPGA), a reduced instruction set computer (RISC) processor, an application specific integrated circuit (ASIC), a programmable logic circuit (PLC), and/or any other circuit or processor capable of executing the functions described herein. In some embodiments, the methods described herein are encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

Exemplary embodiments of BOP methods, systems, and apparatus are not limited to the specific embodiments described herein, but rather, components of systems and/or steps of the methods may be utilized independently and separately from other components and/or steps described herein. For example, the methods may also be used in combination with other systems requiring sensors, and are not limited to practice with only the systems and methods as described herein. Rather, the exemplary embodiment can be implemented and utilized in connection with many other applications, equipment, and systems that may benefit from increased detection reliability.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A detection system to detect an object in a blowout prevention system of a production system, said detection system comprising:
   a sensor coupled to the blowout prevention system and configured to send an ultrasonic pulse toward the object, wherein said sensor is further configured to receive a signal including the ultrasonic pulse and noise after the ultrasonic pulse interacts with the object, wherein the signal and the noise vary over time; and
   a controller coupled to said sensor and configured to identify variations in the signal and provide varying noise cancellation, and further to identify the ultrasonic pulse in the signal using a first cancellation signal at a first time and a second cancellation signal at a second time based on the variations in the signal, wherein said controller is further configured to determine that the first cancellation signal corresponds to the noise in the signal at the first time, and determine that the second cancellation signal corresponds to the noise in the signal at the second time, wherein said controller is configured to determine a characteristic of the object based on the ultrasonic pulse; and
   wherein said controller is further configured to generate the second cancellation signal based on a combination of the first cancellation signal and a third cancellation signal.

2. The detection system in accordance with claim 1, wherein said controller is further configured to access a database including the first cancellation signal and the second cancellation signal.

3. The detection system in accordance with claim 1, wherein said controller is further configured to determine the second cancellation signal based on a distance between said sensor and the object.

4. The detection system in accordance with claim 1, wherein said controller is further configured to determine the second cancellation signal based on a model of said sensor.

5. The detection system in accordance with claim 1, wherein said controller is further configured to compare the signal to at least one of the first cancellation signal and the second cancellation signal.

6. The detection system in accordance with claim 1, wherein said controller is further configured to determine a signal quality metric of the signal.

7. The detection system in accordance with claim 1, wherein said controller is further configured to determine a temporal model of the signal and align the second cancellation signal and the signal based on the temporal model.

8. The detection system in accordance with claim 1, wherein said controller is further configured to determine statistical characteristics of a portion of the signal, and determine the second cancellation signal based at least partially on the statistical characteristics of the portion of the signal.

9. The detection system in accordance with claim 1, wherein said controller is configured to determine a distance between said sensor and the object based on the ultrasonic pulse.

10. A method of detecting an object in a production system, said method comprising:
    receiving, using a sensor, a signal including a first ultrasonic pulse and noise after the first ultrasonic pulse interacts with the object, wherein the signal and the noise vary over time;
    determining, using a controller, that a first cancellation signal corresponds to the noise in the signal at a first time;
    identifying, using the controller, variations in the signal and the first ultrasonic pulse in the signal using the first cancellation signal at the first time;
    determining, using the controller, that a second cancellation signal corresponds to the noise in the signal at a second time;
    identifying a second ultrasonic pulse in the signal using the second cancellation signal at the second time based on the variations in the signal;
    providing varying noise cancellation;
    determining a characteristic of the object based on at least one of the first ultrasonic pulse and the second ultrasonic pulse;
    accessing a database including the first cancellation signal and the second cancellation signal; and
    generating the second cancellation signal based on a combination of the first cancellation signal and a third cancellation signal.

11. The method in accordance with claim 10, wherein determining, using the controller, that a second cancellation signal corresponds to the noise in the signal at a second time comprises determining that the second cancellation signal corresponds to the noise in the signal based on a distance between the sensor and the object.

12. The method in accordance with claim 10, wherein determining, using the controller, that a second cancellation signal corresponds to the noise in the signal at a second time comprises determining that the second cancellation signal corresponds to the noise in the signal based on a comparison of the signal and a temporal model of the sensor.

13. The method in accordance with claim 10 further comprising comparing the signal to at least one of the first cancellation signal and the second cancellation signal.

14. The method in accordance with claim 10 further comprising determining a signal quality metric of the signal.

15. The method in accordance with claim 10 further comprising determining a temporal model of variations in the signal and aligning the second cancellation signal and the signal based on the temporal model.

16. The method in accordance with claim 10 further comprising identifying a portion of the signal, determining a statistical characteristic of the portion of the signal, and generating the second cancellation signal based at least partially on the statistical characteristic of the portion of the signal.

17. The method in accordance with claim 10, wherein determining a characteristic of the object based on at least one of the first ultrasonic pulse and the second ultrasonic pulse comprises determining a distance between the sensor and the object based on the second ultrasonic pulse.

* * * * *